US010445335B2

(12) United States Patent
Kohan et al.

(10) Patent No.: US 10,445,335 B2
(45) Date of Patent: Oct. 15, 2019

(54) COMPUTING ENVIRONMENT CONNECTIVITY SYSTEM

(71) Applicant: Aetna Inc., Hartford, CT (US)

(72) Inventors: Jeffrey M. Kohan, Wallingford, CT (US); Michele A. Dankowski, Vernon, CT (US); David Evan Jones, Chatham, NH (US); Steven Kerins, Bristol, CT (US); Daniel Labella, Trumbull, CT (US)

(73) Assignee: Aetna Inc., Hartford, CT (US)

( * ) Notice: Subject to any disclaimer, the term of this patent is extended or adjusted under 35 U.S.C. 154(b) by 608 days.

(21) Appl. No.: 15/204,556

(22) Filed: Jul. 7, 2016

(65) Prior Publication Data
US 2017/0034036 A1 Feb. 2, 2017

Related U.S. Application Data

(60) Provisional application No. 62/199,725, filed on Jul. 31, 2015.

(51) Int. Cl.
*G06F 16/25* (2019.01)
*H04L 29/08* (2006.01)
(Continued)

(52) U.S. Cl.
CPC ........ *G06F 16/252* (2019.01); *H04L 41/5012* (2013.01); *H04L 41/5019* (2013.01);
(Continued)

(58) Field of Classification Search
CPC ... G06F 16/252; H04L 41/50; H04L 41/5012; H04L 41/5019; H04L 41/5083; H04L 43/0811; H04L 67/16; H04L 67/28
(Continued)

(56) References Cited

U.S. PATENT DOCUMENTS

| 2004/0128583 A1* | 7/2004 | Iulo ..................... G06F 11/0709 714/25 |
| 2012/0246297 A1* | 9/2012 | Shanker .............. H04L 67/2842 709/224 |
| 2015/0156090 A1* | 6/2015 | Paine .................. H04L 41/5012 709/224 |

* cited by examiner

*Primary Examiner* — June Y Sison
*Assistant Examiner* — Adam A Cooney
(74) *Attorney, Agent, or Firm* — Leydig, Voit & Mayer, Ltd.

(57) ABSTRACT

Embodiments of the disclosure provide a system and a method of monitoring connectivity between a plurality of services in a computing environment. The server automatically periodically monitors and aggregates monitored data related to the at least one service through a monitoring application on the server. The monitoring involves collecting and logging status information of the services. The server then connects to the client device, via a mobile gateway, through an application interface (API) on the server. The API includes instructions for sending, receiving, and translating information between the server and the client device. The server then receives, from the client device, a status request. The server sends, from the monitoring application to the API, the monitored data related to the at least one service. Then the server translates, using the API, the monitored data related to the service to obtain the status of the service in the computing environment. Translating involves applying thresholding to the monitored data, utilizing current and historical monitored service status, to categorize the service status. The server sends the status category for the at least one service from the server to the client device via the API.

18 Claims, 13 Drawing Sheets

(51) Int. Cl.
*H04L 12/24* (2006.01)
*H04L 29/06* (2006.01)
*H04L 12/26* (2006.01)
*H04W 88/16* (2009.01)

(52) U.S. Cl.
CPC .............. *H04L 67/16* (2013.01); *H04L 67/22* (2013.01); *H04L 67/28* (2013.01); *H04L 67/2833* (2013.01); *H04L 67/42* (2013.01); *H04L 41/5061* (2013.01); *H04L 41/5083* (2013.01); *H04L 43/0811* (2013.01); *H04W 88/16* (2013.01)

(58) Field of Classification Search
USPC ........................................................ 709/224
See application file for complete search history.

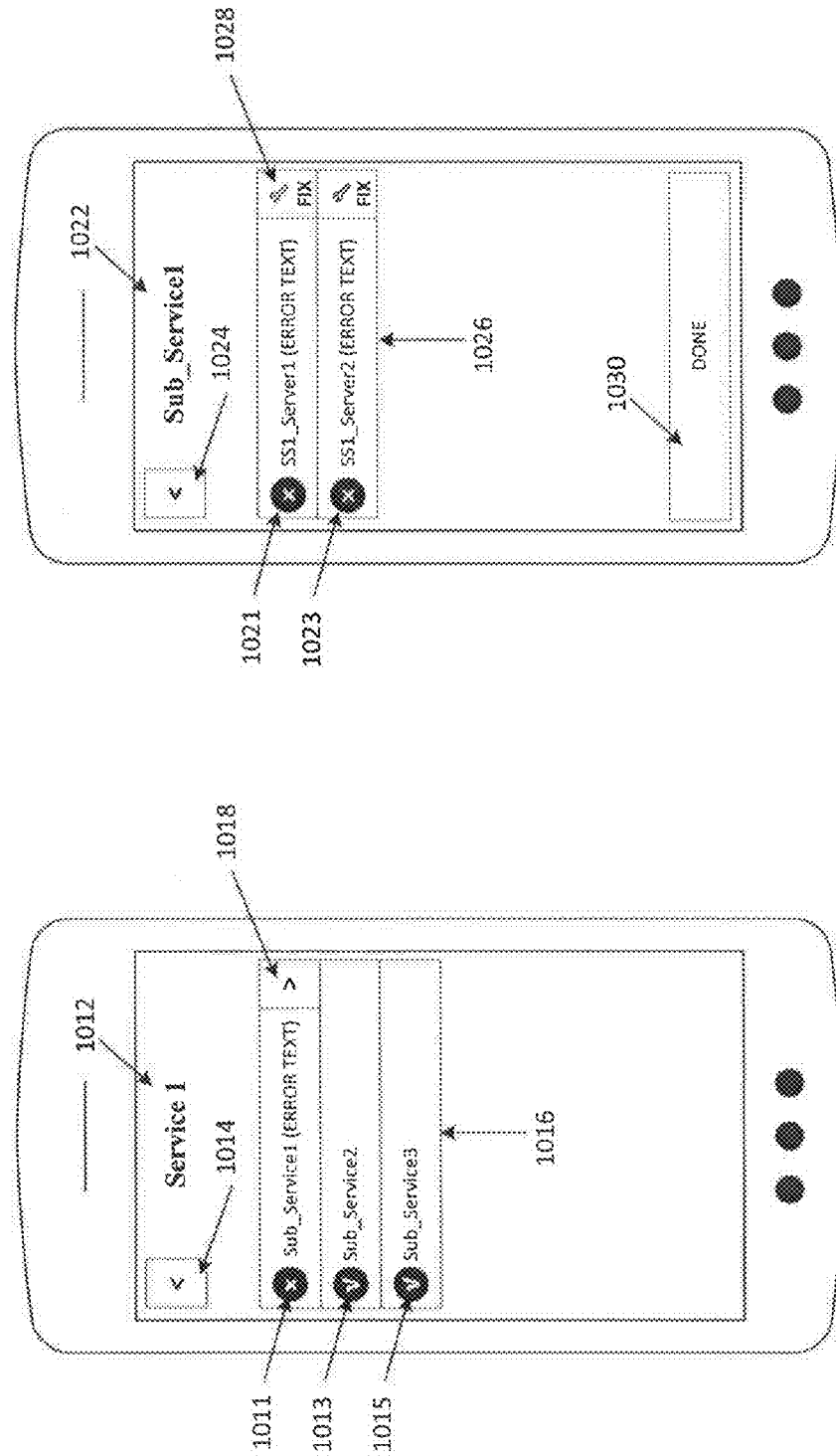

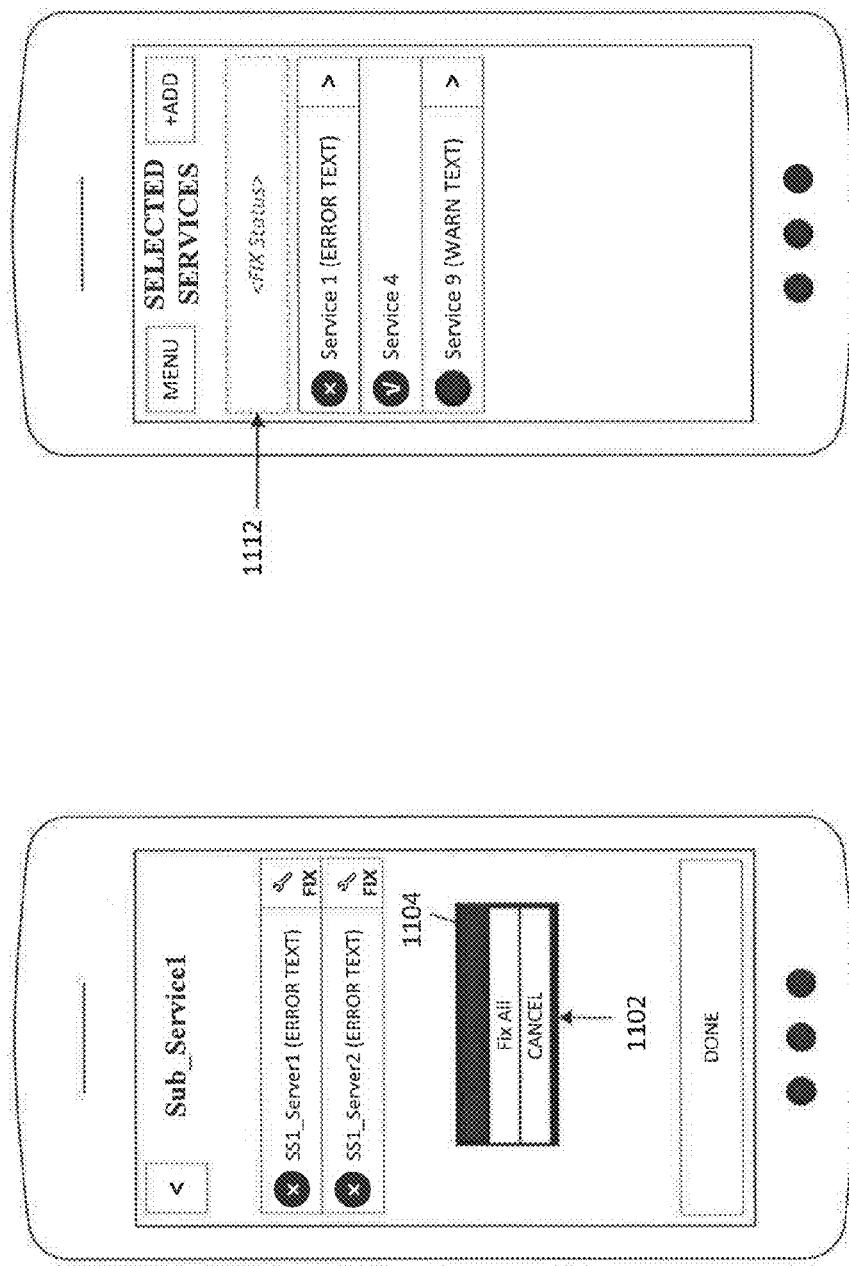

COMPUTING ENVIRONMENT CONNECTIVITY SYSTEM

CROSS-REFERENCE TO RELATED APPLICATIONS

This patent application claims the benefit of U.S. Provisional Patent Application No. 62/199,725, filed Jul. 31, 2015, which is incorporated by reference in its entirety.

BACKGROUND OF THE INVENTION

When monitoring and working with servers and large networked environments, power users and internet technology (IT) support use powerful, bulky machines that can access the servers and network environments and debug errors that occur. The servers run multiple computing processes to support the needs of an organization. Errors with the servers, processes and networked environment may occur without warning. Having a system, such as the servers, processes and network environment, offline to debug errors, especially in enterprise computing spheres, may result in heavy financial losses proportional to the amount of downtime of the servers, processes and network environment. When servers go offline or errors accumulate over time in software and hardware, scheduled maintenance checks are no longer adequate.

BRIEF SUMMARY

One embodiment of the disclosure provides a method of monitoring connectivity between a plurality of services in a computing environment. The computing environment includes a server with a processor that executes computer executable instructions stored on a non-transient computer readable medium. When the instructions are executed, the server automatically periodically monitors and aggregates monitored data related to the at least one service through a monitoring application on the server, wherein monitoring comprises collecting and logging status information of the services. The server then connects to the client device, via a mobile gateway, through an application interface (API) on the server, wherein the API comprises instructions for sending, receiving, and translating information between the server and the client device and wherein the client device is adapted for sending, upon user engagement, a request to the server to provide the monitored status of the at least one service. The server then receives, from the client device, the status request. Due to the status request, the server then causes a sending, from the monitoring application to the API, the monitored data related to the at least one service. Afterwards, the API translates the monitored data related to the at least one service to obtain the status of the service in the computing environment, wherein the translating comprises applying thresholding to the monitored data, utilizing current and historical monitored service status, to categorize the service status prior to sending the service status to the client device. Once completed, the server sends the status category for the at least one service from the server to the client device via the API.

Another embodiment of the disclosure provides a mobile device with a display, a network interface, and a processor to execute computer executable instructions stored on a non-transient computer readable medium so that when the instructions are executed, by the processor, a method is carried out. The method includes upon user engagement, sending, with the network interface via a mobile gateway, to a server running a plurality of services, a request to provide a status of at least one service of the plurality of services. The method further involves receiving, from the server via an API on the server, status category of the at least one service, wherein the status category comprises three levels, the first level indicating a service level problem, the second level indicating a service level warning, and the third level indicating normal operation, and wherein the API on the server comprises instructions for sending, receiving, and translating information between the server and the client device. The method further includes converting the status category to graphical indicators and providing the graphical indicators to be displayed on the display.

Yet another embodiment of the disclosure provides a server for providing a portable client device with a monitored status of at least one service of a plurality of services in a computing environment. The server includes a processor to execute computer executable instructions stored on a non-transient computer readable medium, so that when the instructions are executed, the server automatically periodically monitors and aggregates monitored data related to the at least one service through a monitoring application on the server, wherein monitoring includes collecting and logging status information of the services. The server is further able to connect to the client device, via a mobile gateway, through an application interface (API) on the server, wherein the API comprises instructions for sending, receiving, and translating information between the server and the client device and wherein the client device is adapted for sending, upon user engagement, a request to the server to provide the monitored status of the at least one service. The server may further receive, from the client device, the status request. Due to the status request, the server may cause a sending, from the monitoring application to the API, the monitored data related to the at least one service. Afterwards, the API translates the monitored data related to the at least one service to obtain the status of the service in the computing environment, wherein the translating comprises applying thresholding to the monitored data, utilizing current and historical monitored service status, to categorize the service status prior to sending the service status to the client device. After translating, the server may send the status category for the at least one service from the server to the client device via the API.

BRIEF DESCRIPTION OF THE SEVERAL VIEWS OF THE DRAWINGS

Embodiments of the disclosure will be described in even greater detail below based on the exemplary figures. All features described and/or illustrated herein can be used alone or combined in different combinations in embodiments of the disclosure. The features and advantages of various embodiments will become apparent by reading the following detailed description with reference to the attached drawings which illustrate the following:

FIG. 10B illustrates a sample user interface on a mobile device's display when traversing a hierarchy according to some embodiments of the disclosure;

FIG. 10C illustrates a sample user interface on a mobile device's display when traversing a hierarchy according to some embodiments of the disclosure;

FIG. 11A illustrates a sample user interface on a mobile device's display when attempting a fix operation according to some embodiments of the disclosure;

FIG. 11B illustrates a sample user interface on a mobile device's display when attempting a fix operation according to some embodiments of the disclosure;

DETAILED DESCRIPTION OF THE INVENTION

The disclosure provides a method and system for server managers, such as system engineers, to adequately monitor resources and services in a computing environment that includes on one or more servers. The services, processes and/or resources that may be monitored are provided to a computing device, such as a mobile computing device. Exemplary mobile devices include a smartphone, tablet, phablet, etc. However, other computing devices such as laptops and desktops can also be used. In one embodiment, the mobile computing device then obtains a list of resources of interest from a user, and ultimately provides simple visual indicators for all the selected resources, indicating the status of each of the selected resources. The system described in some embodiments may allow continuous monitoring of computing resources and services in a computing environment without the need of a more powerful computer. The use of a mobile computing device enables use of intelligent systems to provide visual or graphical indicators, simplifying the management dashboard on the mobile computing device. Having such a system encourages proactive monitoring, where errors may be avoided and/or corrected promptly.

Certain embodiments of the disclosure provide a method and system that increases mobility of system engineers or server managers. System engineers using this system may monitor a computing environment away from a computer. The use of the mobile computing device allows quick responses to issues since messages related to fixing identified problems may be sent directly from the mobile computing device. A result of adopting this system is the improvement of overall reliability, availability, and serviceability of services in the computing environment. Reliability is improved since this system may allow faster or even immediate identification of broken connections in hardware and/or software resources in a computing environment.

Figure 1A:
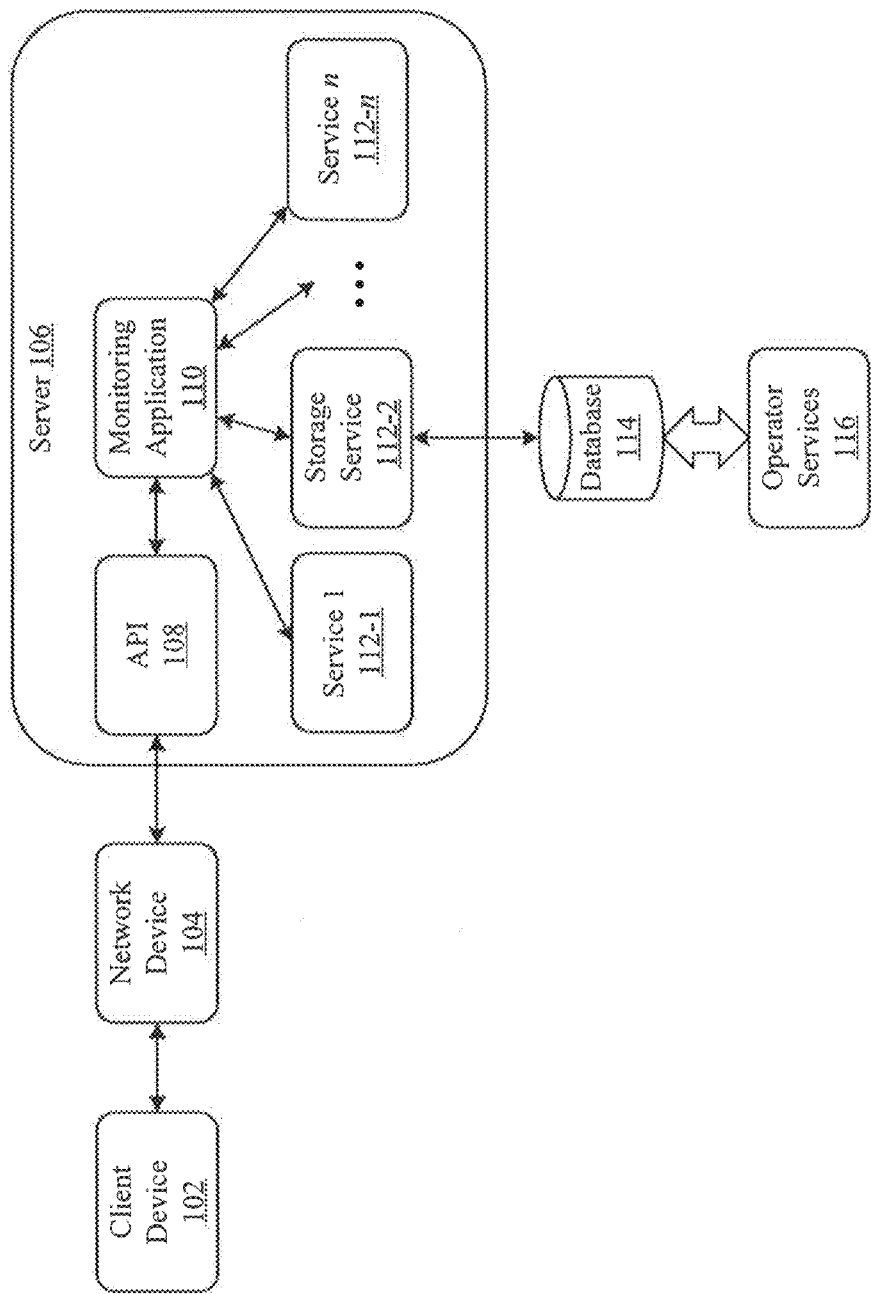
FIG. 1A is a block diagram illustrating a networking environment in accordance with some example embodiments of the disclosure.

FIG. 1A provides a block diagram of a high-level, networking environment where a client device 102 is connected to a server 106 through a network device 104 according to one embodiment. Server 106 is provided as an example and is not limited to a single computing server. For example, server 106 may comprise multiple servers running various applications and providing different services. Network device 104 is provided as a conduit between server 106 and client device 102. Network device 104 may comprise multiple devices, a pipeline, or network that enables communication and data transfer between server 106 and client device 102. Client device 102, net work device 104, and server 106 all have underlying hardware that enable communication, processing, data and command storage, and information flow. Information flow is bidirectional between client device 102 and server 106.

Client device 102, as provided in FIG. 1A, contains at least one storage device, memory, and at least one processor. The storage device and memory contain instructions that allow client device 102 to check the status of a variety of resources or services in server 106. For example, the storage device and memory contain instructions that allow client device 102 to check for hardware and software status of server 106 and also fix or repair problems identified in the hardware and/or software.

In certain embodiments, the instructions contained in storage device and memory of client device 102 enable outgoing commands to an application interface (API) 108 running on server 106. The instructions may also enable commands that organize incoming data from server 106 and provide a visual output on the screen or display of the client device 102 the status of certain software and/or hardware on server 106. For example, the visual output or graphical indicator may indicate a service level problem through a problem symbol or problem color, such as a "Red Light." Likewise the visual output may indicate no problem through an all-clear symbol or all-clear color, such as a "Green Light." Additionally, the visual output may indicate a possible problem or a potential future problem through the use of a caution symbol or a caution color, such as "Yellow Light." These graphical indicators, i.e., problem indicators, caution indicators and/or all-clear indicators, identify whether or not there is a service level problem with a particular hardware/software resource on server 106. In this way, the system can efficiently provide status category information for the monitored systems, resources, and services.

In certain instances, when there is a problem, a problem indicator is provided, and the user of client device 102 is able to obtain further information from the problem indicator. For example, the user of the client device 102 may click on the problem indicator, and client device 102 will provide details of the particular problem(s) including options to fix a specific problem or fix all problems detected. With one click and in one instance, the user of the client device 102 may fix all detected problems or choose to fix one problem.

To enable the previous interaction, one or more services compatible with the commands coming from client device 102 may run on server 106. In FIG. 1A, API 108 serves as such a service. In some embodiments API 108 is a service application that is called by server 106 to obtain status information and/or any discovered problems. API 108 utilizes thresholding to condense extremely complex set of criteria into simple problem, caution, and all-clear indicators that signify service level problems, service level warnings, and normal operation, respectively. In this example, an all-clear indicator signifies all is well, a caution indicator signifies a warning that there may be an issue or that a past issue has been cleared, and a problem indicator indicates there is a service level problem. In the case where there is a problem indicator, the option to obtain further details that allow the user of client device 102 to discover what the problem is and where the problem exists is provided. In certain aspects, API 108 provides these functionalities by communicating with monitoring application 110. Monitoring application 110 may be a system management tool used to evaluate the status or any number of services running on server 106. In FIG. 1A, monitoring application 110 collects real-time data related to the variety of services, i.e., service 1 112-1 through service n 112-n. Monitoring application 110 may also utilize various services in order to complete its tasks. For example, monitoring application 110 may utilize storage service 112-2 to access database 114 in order to retrieve and store data related to the variety of services currently being monitored. In some instances, monitoring application 110 may obtain settings and parameters from database 114. These settings may be altered directly by server 106 or externally through another computing device or terminal denoted as operator services 116 in FIG. 1A.

Operator services 116 may provide operational commands. For example, via parameter dumps to database 114, monitoring application 110 may receive an operational command from an operator console through operator services 116 that seeks operational control over the monitoring application 110. This operational command input may be required for controlling behavior of monitoring application 110 manually. For example, this activity allows proper operation by providing a means to stop the monitoring application 110, reset the internal connection of actions taken in caution indicator events, and reset thresholds for identifying an event with a caution indicator. In certain aspects, the commands include: (i) Stop—a command to shut down the monitoring application 110; (ii) Reset—a command to reset runtime parameters, statistic limits, and controls to modify statuses identified with problem and caution indicators; (iii) History—a command to show history of previous actions taken by monitoring application 110, for example, purged tasks and flagged tasks; (iv) Trace—a command to trace actions taken for diagnostics purposes. In relation to operator services 116, database 114 is configured to save data related to prior actions taken by monitoring application 110, activity of the system workload, and threshold overrides.

Figure 1B:
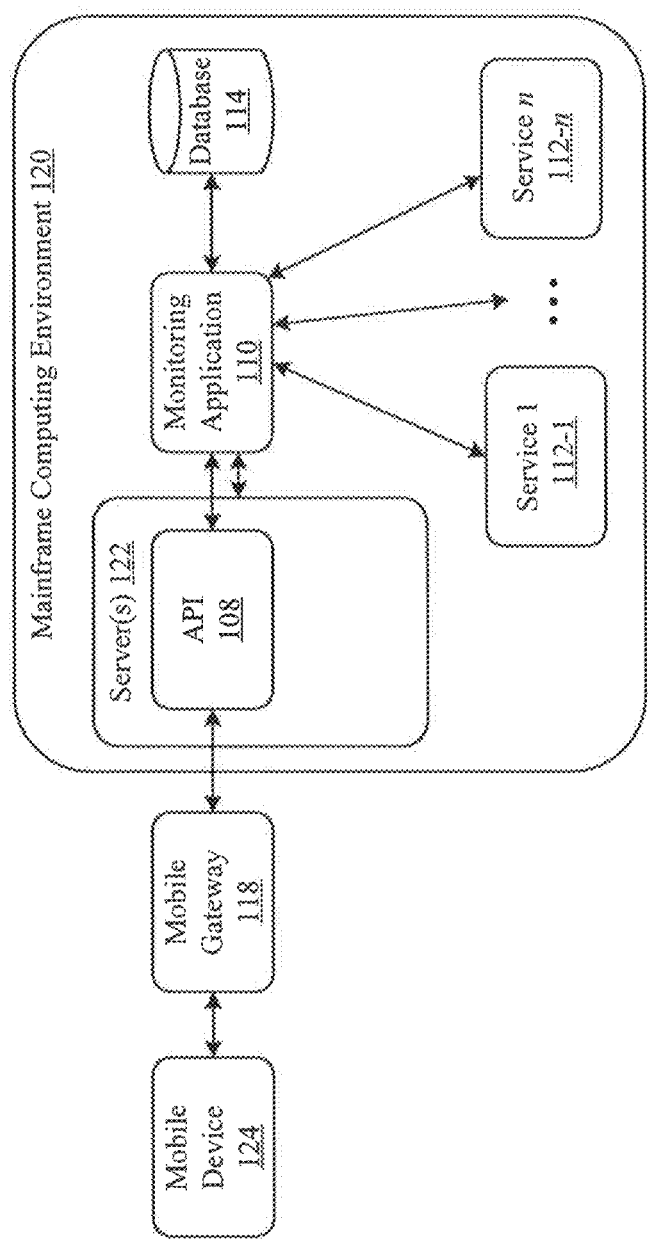
FIG. 1B is a block diagram illustrating a networking environment in accordance with some example embodiments of the disclosure.

FIG. 1B is a block diagram of an example embodiment of a networking environment where a mobile device 124 is connected to a mainframe computing environment (MCE) 120 through a mobile gateway 118. In this embodiment, mobile gateway 118 manages communication and authentication, enabling a network connection between mobile device 124 and MCE 120. Mobile gateway 118 may support multi-factor authentication using a user ID, secure token, and application token. The mobile gateway 118 may also use two way mutual authentication exchanging public keys to validate with private key. Mobile device 124 is analogous to client device 102 of FIG. 1A, mobile gateway 118 is similar to network device 104, and the MCE 120 is akin to server 106. FIG. 1B is provided as an example embodiment to show that MCE 120 may house multiple servers 122 and contain database 114. Additionally, API 108 may be instantiated in the multiple servers 122. In addition to monitoring the services 112-1 through 112-n, monitoring application 110 may store in database 114 data related to the observed behaviors of the multiple servers 122.

In some instances of the embodiment of FIG. 1B, the mobile gateway 118 may utilize software such as Kony Middleware, the API 108 may be a Web service compatible with HTTP (Hypertext Transfer Protocol) and machine readable file formats such as XML (Extensible Markup Language) and JSON (JavaScript Object Notation). In some embodiments, servers 122 running the API 108 may be Customer Information Control System (CICS) Servers. Monitoring application 110 may utilize multiple tools in order to inquire on the current and historical status of any number of mainframe infrastructure components. Monitoring application 110 is able to collect and log data related to status information from software and/or hardware present in MCE 120. For example, monitoring application 110 may obtain data from a database management infrastructure software, such as DB2, a message delivery and queuing infrastructure software WebSphere MQ (WMQ), and other running software and services. Monitoring application 110 aggregates data related to status of the services and stores this information in database 114. Mobile device 124 runs a mobile application that is able to display information to a user and take inputs from the user. The mobile application interacts with API 108 running in the MCE 120. The API 108 operates as a translator, taking complex monitoring criteria in the computing environment and providing simple indicators for software and/or hardware status. Additionally, the API 108 accepts requests from mobile device 124 through the mobile application. Going back to the general case of FIG. 1A, the following discussion will provide hardware components that may be found in client device 102 and server 106 as depicted in FIGS. 2 and 3, respectively.

Figures 2, 3:
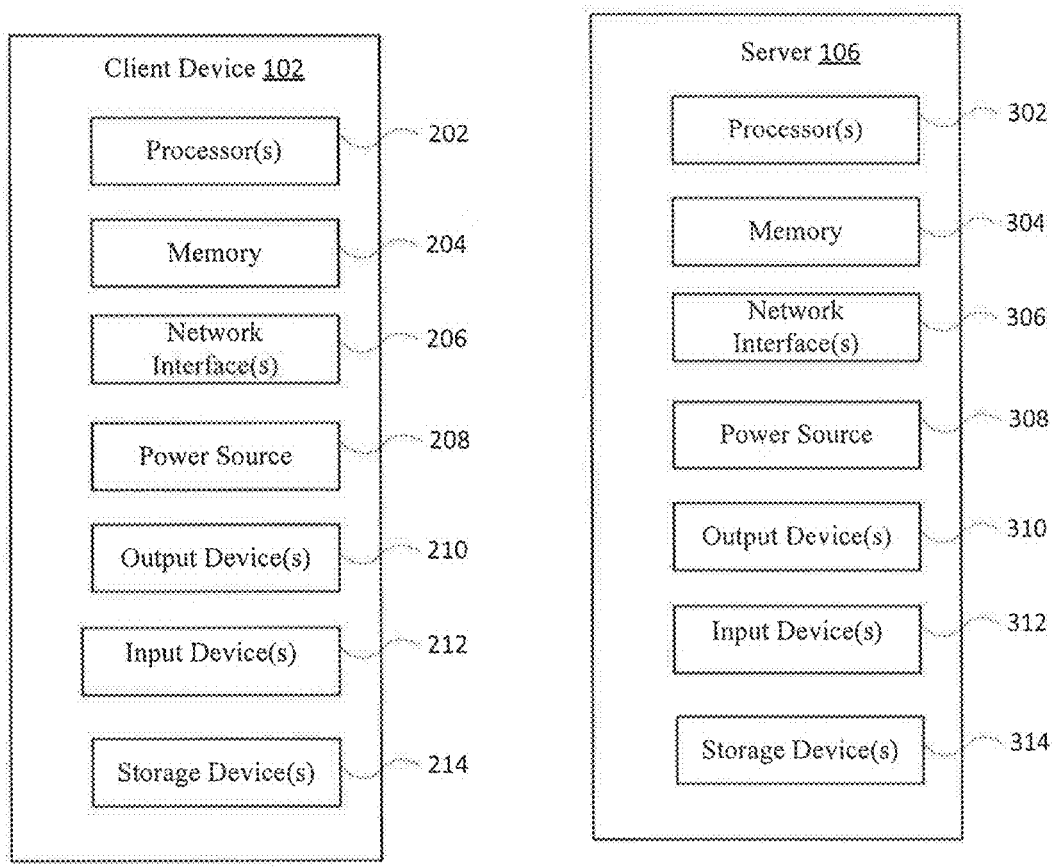
FIG. 2 is a block diagram illustrating components of a client device from the system depicted in FIG. 1A according to some example embodiments.
FIG. 3 is a block diagram illustrating components of a server according to some example embodiments.

FIG. 2 illustrates a block diagram of the basic hardware components for the client device 102 according to some aspects of the disclosure. The client device 102 may include one or more processors 202, memory 204, network interfaces 206, power source 208, output devices 210, input devices 212, and storage devices 214. Although not explicitly shown in FIG. 2, each component provided is interconnected physically, communicatively, and/or operatively for inter-component communications in order to realize functionality ascribed to the client device 102. To simplify the discussion, the singular form will be used for all components identified in FIG. 2 when appropriate, but the use of the singular does not limit the discussion to only one of each component. For example, multiple processors may implement functionality attributed to processor 202.

Processor 202 is configured to implement functions and/or process instructions for execution within the client device 102, For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within client device 102 during operation. In some embodiments, memory 204 includes a temporary memory that does not retain information stored when the client device 102 is turned off. Examples of such temporary memory include volatile memories such as random access memories (RAM), dynamic random access memories (DRAM), and static random access memories (SRAM). Memory 204 also maintains program instructions for execution by the processor 202 and serves as a conduit for other storage devices (internal or external) coupled to client device 102 to gain access to processor 202.

Storage device 214 includes one or more non-transient computer-readable storage media. Storage device 214 is provided to store larger amounts of information than memory 204, and in some instances, configured for long-term storage of information. In some embodiments, the storage device 214 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The client device 102 may comprise multiple network interfaces 206 to facilitate communication via multiple types of networks. Network interfaces 206 may comprise network interface cards, such as Ethernet cards, optical transceivers, radio frequency transceivers, or any other type of device that can send and receive information. Non-limiting examples of network interfaces 206 include radios compatible with several Wi-Fi standards, 3G, 4G, Long-Term Evolution (LTE), Bluetooth®, etc.

Power source 208 provides power to client device 102. For example, client device 102 may be battery powered through rechargeable or non-rechargeable batteries utilizing nickel-cadmium or other suitable material. Power source 208 may include a regulator for regulating power from the power grid in the case of a device plugged into a wall outlet, and in some devices, power source 208 may utilize energy scavenging of ubiquitous radio frequency (RF) signals to provide power to client device 102.

Client device 102 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to user 104.

Client device 102 is equipped with one or more input devices 212. Input devices 212 are configured to receive input from user 104 or the environment where client device 102 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for client device 102 are functionally and communicatively coupled to achieve certain behaviors. In some embodiments, these behaviors are controlled by software running on an operating system of client device 102.

In FIG. 3, a block diagram of server 106 is provided with exemplary components. The behavior, function, and description of the various components are analogous to those already described for client device 102. For example, server 106 may include one or more processors 302, memory 304, network interfaces 306, power source 308, output devices 310, input devices 312, and storage devices 314. The description for these components will not be provided, but it is understood that examples of these components may include those already provided for client device 102.

Figure 4:
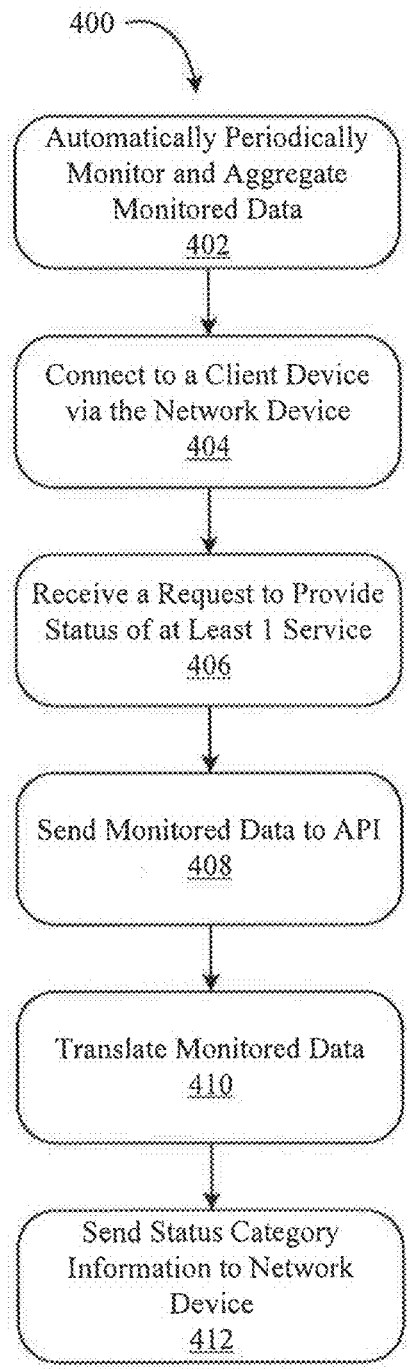
FIG. 4 is a flow diagram showing a query operation according to some embodiments of the disclosure.

FIG. 4 is a flow diagram showing steps of how server 106 may respond to a Query request by client device 102 according to some embodiments of the disclosure. In the query response process 400, at step 402, server 106 periodically aggregates monitored data. As already mentioned, monitoring application 110 collects data from several software and/or hardware components of server 106, and organizes the collected data and stores the collected data in database 114. In some instances, the most recent data collected is held in quickly accessible memory like RAM. The monitoring application 110 automatically performs this operation periodically and in near real-time, for example, every 15 seconds or at some specified interval. Therefore, at step 402, the monitoring application automatically periodically monitors and aggregates monitored data related to at least one service (software and/or hardware service) by collecting and logging status information of the services.

At step 404, server 106 connects to a network device. This step may be a response of the server 106 to an initiated request from client device 102 for a network connection. As such, network device 104 serves as a conduit between server 106 and client device 102. The connection of the server 106 to the client device 102 via the network device 104 is accomplished using API 108, where API 108 includes instructions for sending, receiving, and translating information between the server 106 and client device 102. Client device 102 is adapted for sending, upon user engagement, a request to the server to provide a status of a hardware and/or software service.

At step 406, server 106 receives a request through network device 104 to provide a status of at least one service running on server 106. Client device 102 sends a request through a network device 104, and the request is received at server 106. For example, referring to FIG. 1B, mobile device 124 sends a JSON request to mobile gateway 118. After receiving the request, mobile gateway 118 translates the JSON request into an appropriate form for processing. For example, the JSON request may be translated to a flat copybook structure to be accessed by different services. This translation makes the request accessible to the API 108. The API 108 then determines that the translated JSON request carries a Query request.

At step 408, after realizing the Query request, the API 108 requests information pertaining to the Query request from the monitoring application 110, and the monitoring application 110 sends monitored data to the API 108. In one embodiment, monitoring application 110 queries specified resources in the Query request to determine if something is broken. The reception of the Query request then prompts monitoring application 110 to gather monitored data related to the specified resources in the request. This data gathering may be performed impromptu as a response to the Query request and does not need to be in timing with a specified data gathering period or schedule. The monitored data related to the specified resources is sent to the API 108 for further processing.

At step 410, the API 108 translates the monitored data received from monitoring application 110. In some embodiments, this involves determining whether a real-time resource (software and/or hardware specified in the Query request) under evaluation is in a broken status, is missing a required resource, or has inadequate resources. In certain aspects, a resource is broken if disconnected. The API 108 views historical query and evaluation of resource status, timers, and statistics also provided as part of the monitored data. Historical data is used to determine whether something happened in the recent past, for example, 10 minutes ago, that may need to be adjusted or repaired.

After obtaining monitored data on the resource under evaluation, a thresholding criteria is applied to determine whether the resource is broken or not broken. In certain embodiments, by default, when no error messages are detected in the monitored data, the status is provided as OK. This identifies that all items evaluated are not broken or do not have an identified recent past event that may need to be addressed, for example, the resource under evaluation is not short on a monitored resource. These may include being short on required storage, short on processor threads, or any other resource threshold. When an error message is gleaned, the resource list and property are identified, and an indicator such as a broken flag or a warning flag is generated. At step 410, in translating, the API 108 applies thresholding to the monitored data using current and historical monitored status of services or resources to categorize service status prior to sending the service status to the client device 102.

At step 412, after creating the different indicators, the API 108 sends status category information to the client device 102 through network device 104. Status category information is generated by the API 108 based on the various indicators generated at step 410. For example, a broken flag may be represented with a problem indicator, a warning flag may be represented with a caution indicator, and the absence of an error for a specific resource may be represented with an all-clear indicator. While monitoring, when a resource under evaluation has enough threads, storage, and is communicating with other resources as expected, then these qualities in unions is interpreted as an absence of an error for the resource under evaluation. The problem, caution, and all-clear indicators are used here as examples, but more than three levels may be defined. In some instances, only a problem and an all-clear indicator are defined. In some instances, the status category information may be sent in a standard JSON format, and in order to reduce network traffic, all-clear indicators may not be sent, but only caution and problem indicators. This way, a default state (all-clear) is assumed by the client device 102, and only the non-default states (problem and caution) are transmitted since these may be rarer occurrences compared to the default state.

Figure 5:
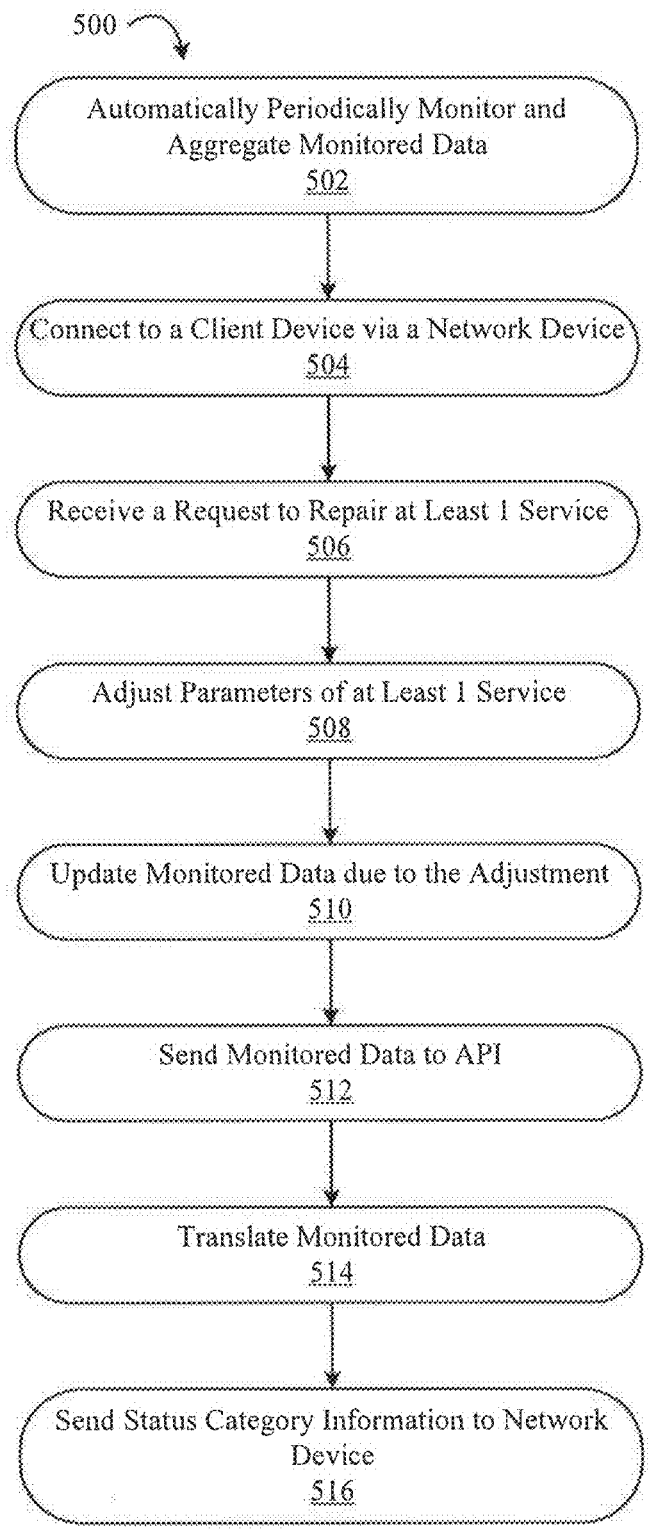
FIG. 5 is a flow diagram showing a repair operation according to some embodiments of the disclosure.

FIG. 5 is a flow diagram showing steps of how server 106 may respond to a Fix or Repair request by client device 102 according to some embodiments of the disclosure. In the Fix response process 500, steps 502 and 504 are analogous to steps 402 and 404 of the query response process 400. In these steps, monitoring application 110 collects, organizes, and stores data related to the operation of several hardware and/or software components in server 106.

At step 506, server 106 receives a request through network device 104 to repair or fix a service level problem in at least one service running on server 106. As in step 406, client device 102 sends a request through network device 104, and the request is received at server 106. For example, referring to FIG. 1B, mobile device 124 has the option to select a given property for a specified resource/service or a given property for all problematic resources/services. For instance, the user of mobile device 124 may fix a DB2 property in all CICS resources or fix a DB2 property in a specific CICS resource. As in step 406, a JSON request may carry the Repair request, and the API 108 is built to determine the type of request received at server 106.

At step 508, after realizing the Repair request, the API 108 directs a specified action be taken in response to the request. This step involves adjusting parameters of the at least one service that has a service level problem. This step may involve invoking scripts running on server 106 to perform the repair. For example, if a service is short on storage, then storage is increased by a predetermined value. In that case, a rule may be incorporated of the form:
  if variable condition,
  then adjust parameters by a pre-determined value.
In the example of shortage of storage, the variable monitored may be a percentage of a storage quota, and the condition may be checking to see if the storage quota exceeds 85% for an important program currently running. The parameters may be adjusted by increasing the storage quota for the program, removing temporary files to free up more storage space, etc.

At step 510, after adjusting parameters of the at least one service/resource, monitoring application 110 updates monitored data in order to provide the most current status of the resource after the adjustment. This step is similar to the actions performed at step 502.

Steps 512, 514, and 516 are analogous to steps 408, 410, and 412 and will not be repeated. These steps are performed to in order to provide the client device 102 with the most recent status as a response to the Fix query sent by the client device 102.

Figure 6:
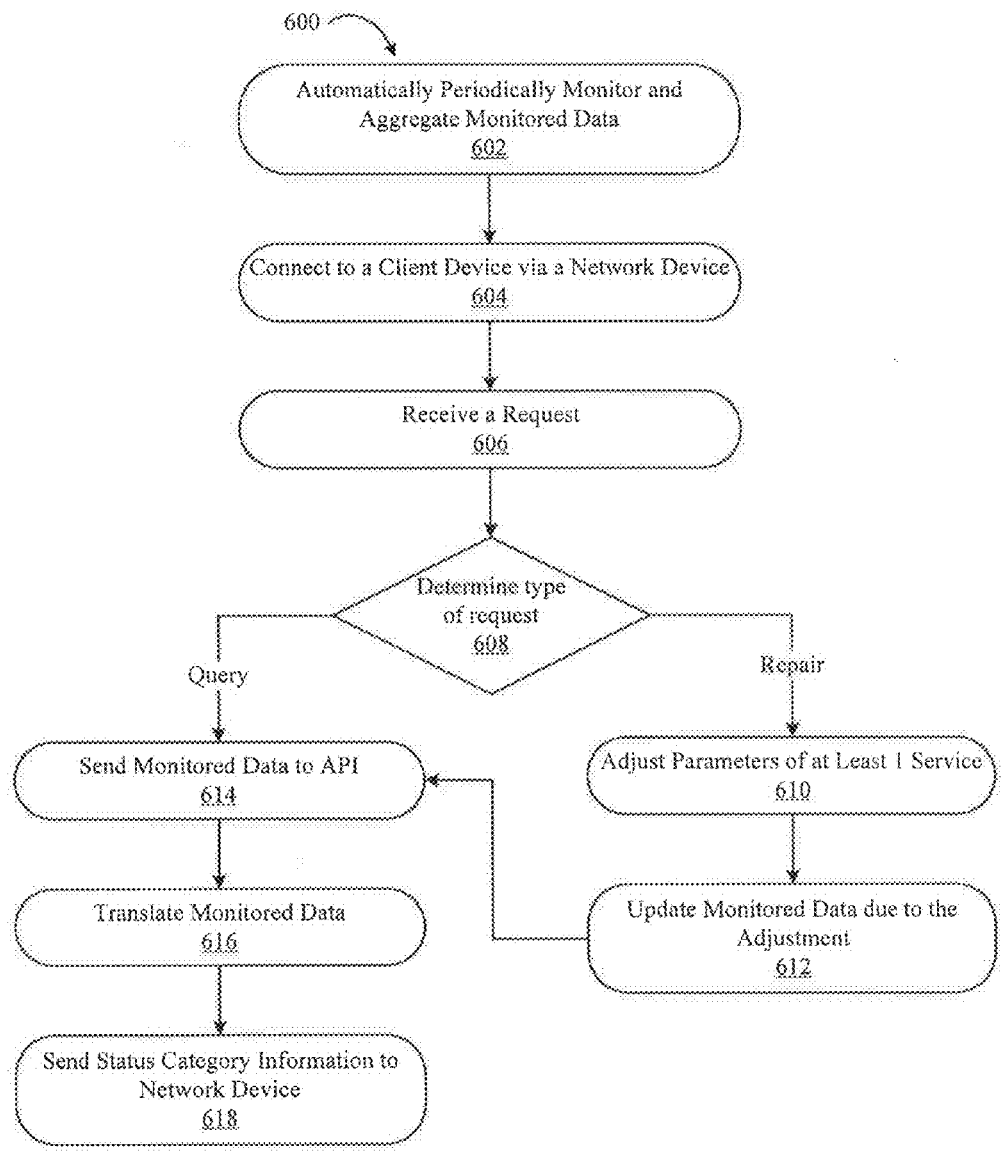
FIG. 6 is a flow diagram showing a query or repair operation according to some embodiments of the disclosure.

FIG. 6 is a flow diagram showing steps of how server 106 may respond to a request by client device 102 according to some embodiments of the disclosure. FIG. 6 is yet another embodiment that combines process 400 and process 500 of FIGS. 4 AND 5, respectively. Steps 602 and 604 are analogous to steps 402 and 404. In these steps, the monitoring application 110 collects, organizes, and stores data related to the operation of several hardware and/or software components in server 106. At step 606, server 106 receives a request at the API 108. Afterwards, at step 608, the API 108 determines what type of request it is responding to. If a Query request, then steps 614, 616, and 618 are performed in order to provide the client device 102 with the most recent status as a response to the Query request. Step 614 involves sending monitored data to the API, step 616 involves translating the monitored data by the API, and step 618 involves sending status category information to the client device 102 via the network device 104. These three steps are analogous to steps 408, 410, and 412 of FIG. 4. After step 608, if a Repair request, then steps 610 and 612 are performed before steps 614, 616, and 618. Steps 610 and 612 involve adjusting parameters of at least one service/resource and updating the monitored data after the adjustment respectively. These steps are analogous to steps 508 and 510 already described.

Figure 7:
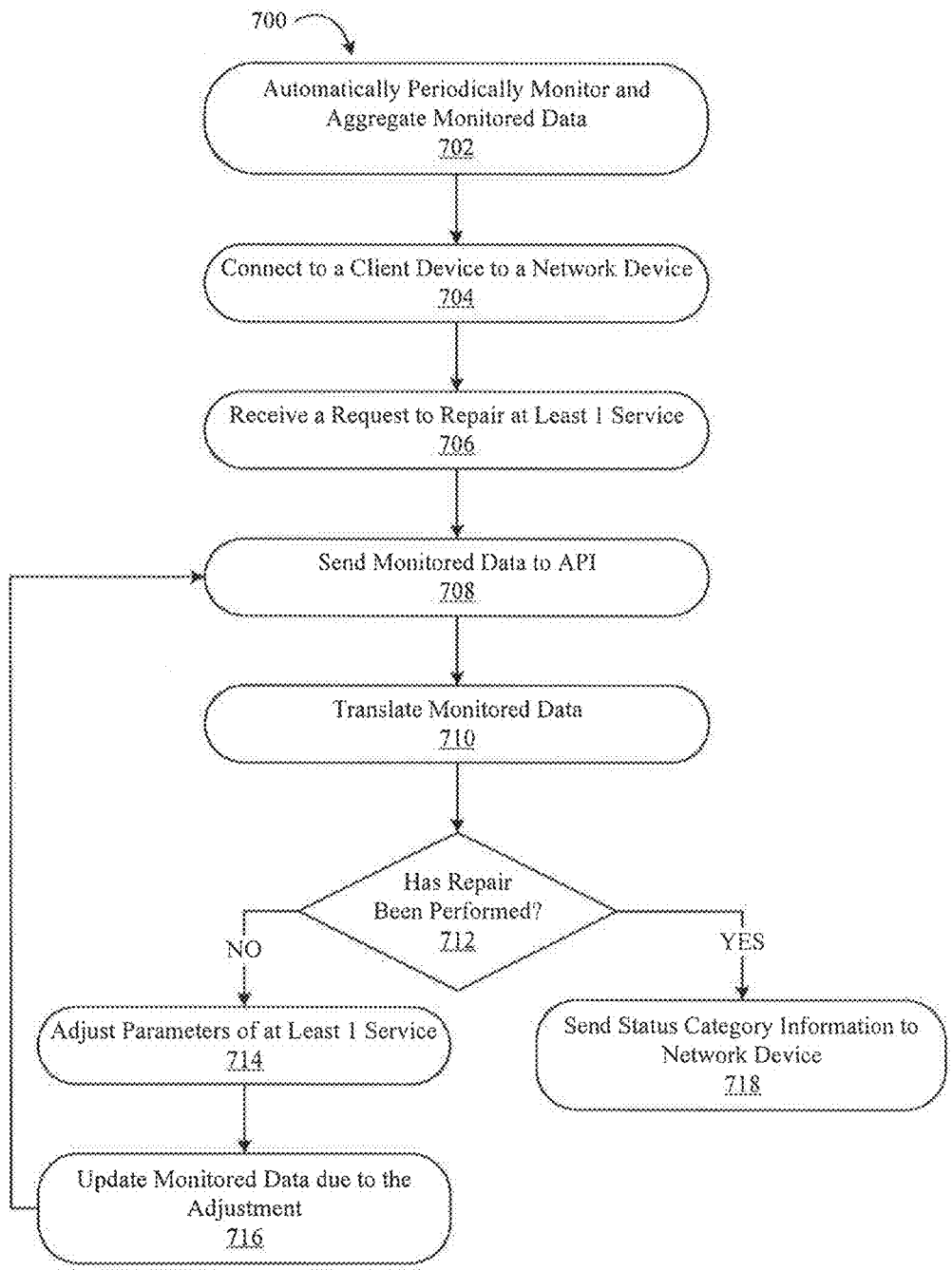
FIG. 7 is a flow diagram showing a query and repair operation according to some embodiments of the disclosure.

FIG. 7 is a flow diagram showing steps of how server 106 may respond to a Repair request by client device 102 according to some embodiments of the disclosure. The steps in FIG. 7 are analogous to the steps in previous embodiments with similar names. The process 700 identified in FIG. 7 is different from previous embodiments in that process 700 determines whether a repair is necessary before attempting to repair. Steps 702 and 704 are analogous to steps 402 and 404 of FIG. 4. In these steps, monitoring application 110 collects, organizes, and stores data related to the operation of several hardware and/or software components in server 106. At step 706, server 106 receives a request through network device 104 to repair or fix a service level problem in at least one service running on server 106. Step 708 involves sending the monitored data to the API and step 710 involves translating the monitored data; these two steps are analogous to steps 408 and 410 in FIG. 4. At step 712, the API 108 determines whether a repair has been performed, and if it has, then the status category information is sent to network device at step 718. If not, then parameters are adjusted in step 714 and monitored data updated in step 716. These steps are analogous to steps 508 and 510 of FIG. 5, respectively. After updating monitored data, the monitored data is sent to the API at step 708 and then translated by the API at step 710. Since repair has been performed, step 712 evaluates to "YES" and the status category information is sent to network device 104 at step 718.

Figure 8:
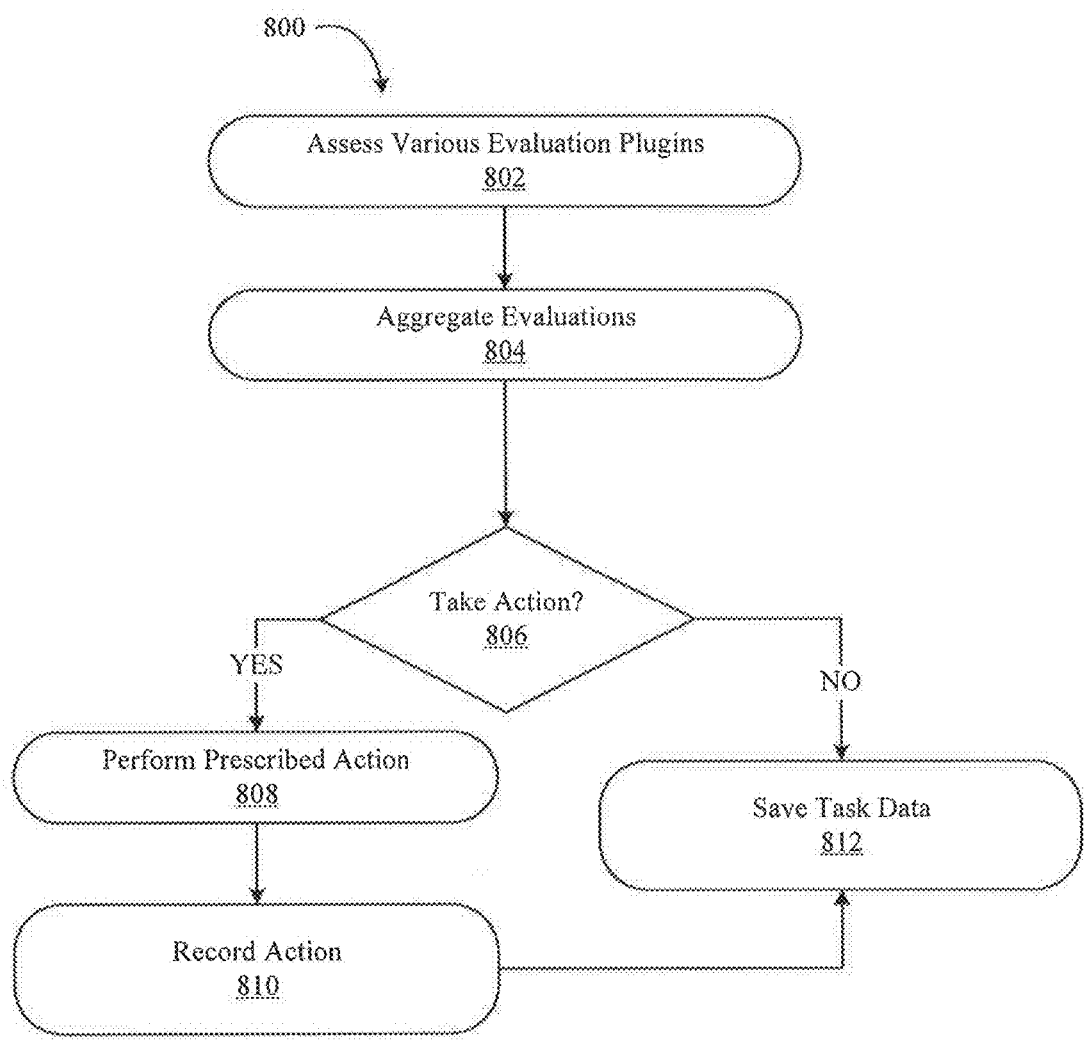
FIG. 8 is a flow diagram showing a monitoring application's operation according to some embodiments of the disclosure.

FIG. 8 is a flow diagram showing a monitoring application's operation according to some embodiments of the disclosure. Monitoring application 110 samples the computing environment at a specified interval, for example, every 2 minutes, or when woken by a request from client device 102. At step 802, monitoring application 110 assesses various evaluation plugins, taking into account different workloads of services of server 106. In some instances, the evaluation plugins have criteria that include taking action for a specific transaction identifier (ID), dispatch time, wall-clock runtime, task suspend time, task suspend type, task suspend value, terminal facility, program ID, user ID, unit of work ID, unit of work age, file requests, terminal errors, etc. For example, for each service or resource, monitoring application 110 may be configured to evaluate status of a transaction ID (enabled or disabled); evaluate a user ID (for resource access permissions or permission to access other services); evaluate program ID (for program access permissions); evaluate database requests (for resource connectivity status to the database); evaluate task suspend time, task suspend type, and task suspend value (to determine whether a task has stalled or whether the task is waiting for another task to be completed), etc. Monitoring application 110 may be customized to run different sets of evaluation plugins for different resources or services.

At step 804, all evaluations are aggregated and then a decision on whether an action should be taken is made in step 806. If an action is to be taken, at step 808, the action is performed and documentation is gathered. Some non-limiting examples of actions include canceling threads or purging errant tasks, and obtaining dump files, trace files, or other diagnostic information.

At step 810, a record of the action taken is made. At step 812, the evaluated task data is saved in database 114. By saving the task data, the actions performed in the task can be reviewed again by subsequent monitor review, and the states may be compared to determine if further action needs to be taken. Certain instances where further action is necessary would be classified with a caution indicator. In certain embodiments, the purpose of the monitoring process 800 is to determine whether a service level warning status exists due to any one of the potential causes identified in at step 802. If a service level warning event status exists, the user of the client device 102 is capable of determining whether the system is acting as expected, that is, within an acceptable range for the given task, or whether the condition needs to be addressed.

Figures 9A, 9B:
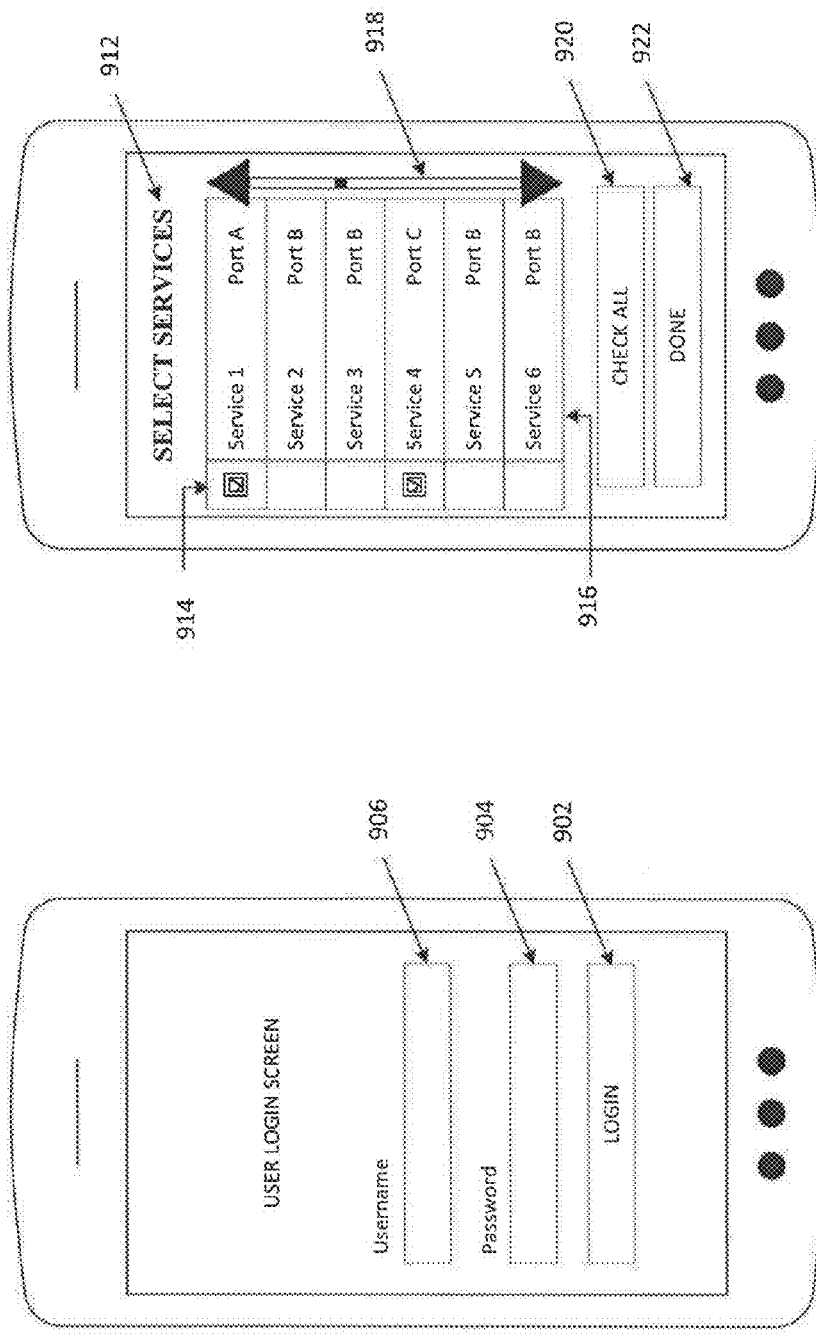
FIG. 9A illustrates a sample user interface on a mobile device's display when selecting one or more services according to some embodiments of the disclosure.
FIG. 9B illustrates a sample user interface on a mobile device's display when selecting one or more services according to some embodiments of the disclosure.

The remaining figures in the disclosure provide example embodiments of user interfaces on a mobile device. FIG. 9A illustrates a sample login user interface on a mobile device's display. A login button 902 may be provided with interactive fields 904 and 906 that receive a password and a username, respectively. FIG. 9B illustrates a sample user interface on a mobile device's display when selecting one or more services according to some embodiments of the disclosure. After logging in, a user is provided a "Select Services" screen 912. In this screen, multiple services that may be monitored may be provided as shown in item 916. Other information related to the services, for example, port information may be provided as well. A mechanism for selecting, such as checkboxes, may be provided as shown in item 914 so a user may select one or more services of interest. A scrollbar 918 may be provided for ease of navigation, and a user may have the option of selecting all services with the "check All"button 920. Once the user has made his or her selection, a "Done" button 922 may be provided to save settings.

Figure 10A:
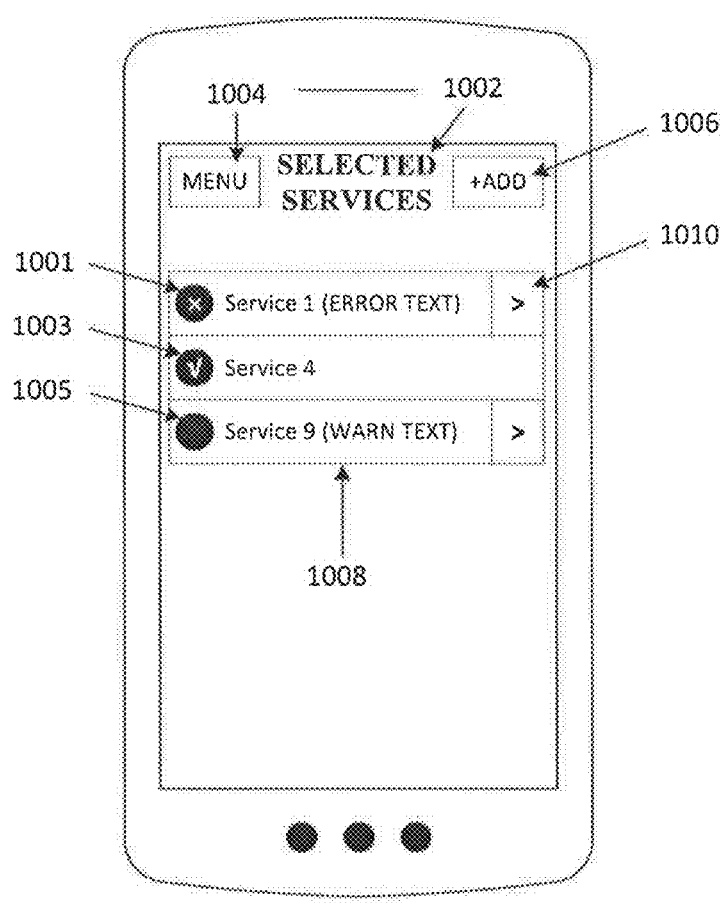
FIG. 10A illustrates a sample user interface on a mobile device's display when traversing a hierarchy according to some embodiments of the disclosure.

FIGS. 10A-C illustrates sample user interfaces on a mobile device's display when traversing a hierarchy according to some embodiments of the disclosure. In FIG. 10A, a "Selected Services" screen 1002 is provided where two services are shown as currently being monitored (item 1008). The "Selected Services" screen 1002 may have a "Menu" button 1004 for ease of navigation, changing settings, or viewing other operations. The "Selected Services" screen 1002 may also include an "Add" button 1006 that provides the option to add more services to the group currently being monitored. Item 1008 shows that "Service 1" has an error associated with it, "Service 4" is running fine, and "Service 9" has a warning. Graphical depictions of the already introduced indicators (problem, caution, and all-clear) are known in short form as graphical indicators and are used to quickly discern the status of each service. "Service 1" has to its left a problem indicator 1001 that signifies a service level problem, "Service 4" has to its an all-clear indicator 1003 that signifies normal operation, and "Service 9" has to its left a caution indicator 1005 that signifies a service level warning. In some embodiments, in addition to the graphical indicators, a brief text providing an idea of what the error is may be displayed as well, for example, "ERROR TEXT" in item 1008 may read "Disconnected" signifying that "Service 1" is not responding. "WARN TEXT" in item 1008 may provide similar information, for example, "WARN TEXT" may read "Insufficient Privileges" signifying that the user's credentials are not able to access data related to "Service 9." When a monitored service has an error or warning associated, a "More Information" button 1010 is provided next to the service. When the "More Information" button 1010 is pressed, a display such as that of FIG. 10B is provided.

In some cases, for mobile device 124 to display the user interface provided in some embodiments of the disclosure, mobile device 124 receives status category information from mobile gateway 118 through a network interface. The status category information is then transferred to memory, and a processor organizes the status category information in memory for quicker display by the mobile device's display. When displaying status category information, the processor retrieves service names from memory and associates each name with status category information. For each status category information, a corresponding graphical indicator is associated. The processor then creates a picture file in memory. For example, in FIG. 10A, a menu is generated to the top left, a title "Selected Services" is generated in the top middle, and an "Add" button 1006 is generated at the top right. The processor then creates a list with a graphical indicator next to a service name, and depending on the graphical indicator, a "More Information" symbol may be generated as well. Once all service line items have been created, the picture is complete. The mobile device's display then reads this picture from memory. In FIG. 10A, when the "More Information" button 1010 is pressed, a user interface such as that of FIG. 10B is provided.

In FIG. 10B, an identifier of the service selected is provided as title 1012 (in this case "Service 1"). A "Back" button 1014 is provided to return to the previous screen. "Service 1" is shown to be associated with multiple subservices, for example, "Sub_Service1," "Sub_Service2", and "Sub_Service3" shown in item 1016. Item 1016 shows that two out of the three subservices under "Service 1" are running properly while "Sub_Service1" has an error associated with it. These statuses are easily identified due to the presence of graphical indicator 1011 next to "Sub_Service1" that shows an error and graphical indicators 1013 and 1015 showing normal operation for "Sub_Service2" and "Sub_Service3." When "More Information" button 1018 is pressed, a display such as that of FIG. 10C is provided.

In FIG. 10C, an identifier of the service selected is provided just like in the previous figure. FIG. 10C, a different level of the hierarchy compared to FIGS. 10A-B may show, for example, particular servers where the error stems. Multiple servers may coordinate to provide one service, or a service may run a distributed process across multiple servers. As such, FIG. 10C provides an embodiment where the servers responsible for "Sub_Service1" are shown to have an error associated with them both. Graphical indicator 1021 and graphical indicator 1023 both signify that "SS1_Server 1" and "SS1_Server2" both have errors or service level problems. At this level of the hierarchy, a "Fix" button 1028 is displayed next to the servers with errors (see item 1026). Additionally, a "Done" button 1030 is provided.

FIGS. 11A-B illustrate sample user interfaces of a mobile device's display when attempting a fix operation according to some embodiments of the disclosure. In some embodiments, as shown in FIG. 11A, when either "Fix" button is pressed, a pop-up menu 1102 appears providing options to fix the selected server, fix all servers. When a "Fix" operation is underway, FIG. 11B provides a sample screen that shows that a "Status" area 1112 may be populated with the result of the "Fix" operation. The status may be that the fix succeeded or failed. In some embodiments, the "Status" area 1112 is unnecessary since the user of the mobile device will know from the symbolic indicators next to a service whether the "Fix" operation was successful.

Figures 12A, 12B:
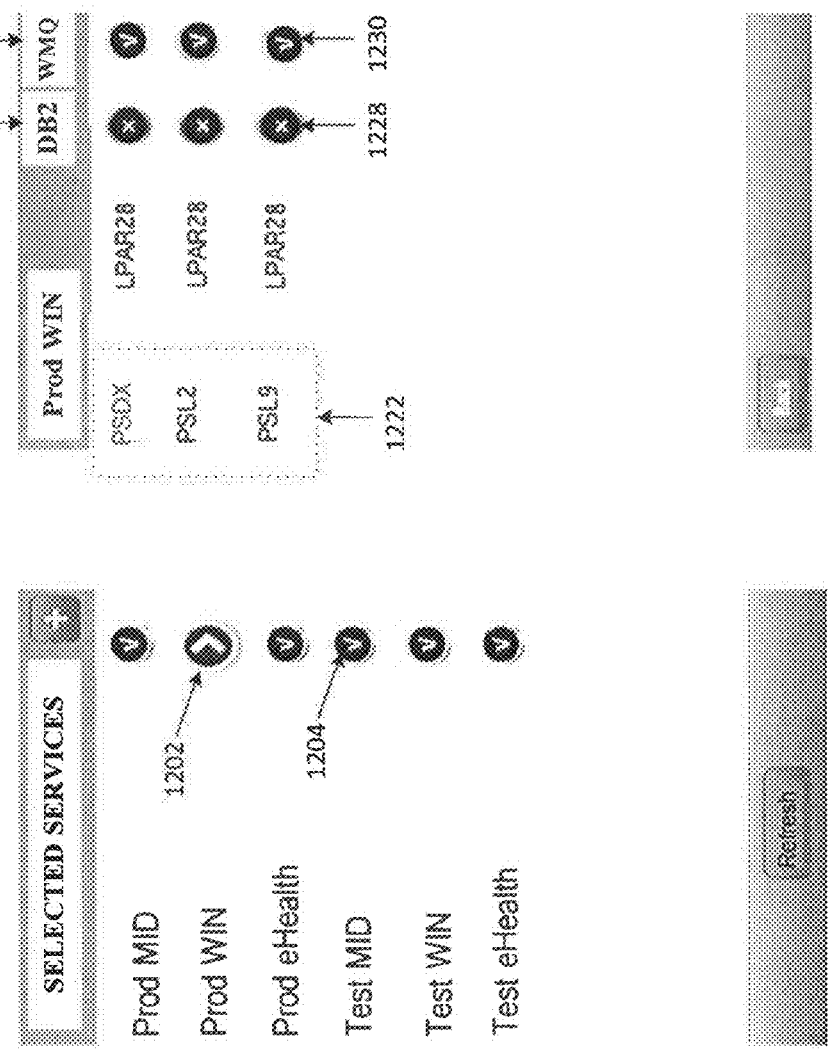
FIG. 12A illustrates a sample user interface on a mobile device's display according to some embodiments of the disclosure.
FIG. 12B illustrates a sample user interface on a mobile device's display according to some embodiments of the disclosure.

FIGS. 12A-B provide another embodiment user interfaces on a mobile device's display. In the embodiment of FIGS. 12A-B, "Prod WIN" is indicated to have a service level problem. In this embodiment, there are only two levels shown—a service level problem and normal operation. Service level problems are indicated with a graphical indicator 1202 and normal operation is indicated with graphical indicator 1204. Also provided in this embodiment is the combination of an indication of a service level problem and the ability to obtain more information using the graphical indicator 1202. Thus, a separate button to obtain more information is not needed, thereby conserving space on the mobile device's display. From the specific environment, the service level problem is related to reliable connections to WMQ and/or DB2 services. By using the "More Information" arrow in the graphical indicator 1202, the details provided for "Prod WIN" may be obtained in FIG. 12B. In FIG. 12B, the servers are listed as shown in item 1222, and the services are listed in column format as shown in DB2 1224 and WMQ 1226. All servers for "Prod WIN" currently do not have access to DB2 services but the WMQ resources are fine. This conclusion is visually apparent for example on server "PSL9" where under the DB2 1224 column, graphical indicator 1228 indicates a problem with DB2 services on this server while under the WMQ 1226 column, graphical indicator 1230 indicates that the WMQ services are operating normally.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described element in all possible variations thereof is encompassed by the invention unless otherwise indicated herein or otherwise clearly contradicted by context.

The invention claimed is:

1. A method of providing a portable client device with a monitored status of at least one service of a plurality of services in a computing environment, the computing environment comprising a server comprising a processor to execute computer executable instructions stored on a non-transient computer readable medium, so that when the instructions are executed, the server performs the method of:

automatically periodically monitoring and aggregating monitored data related to the at least one service through a monitoring application on the server, wherein monitoring comprises collecting and logging status information of the services;

connecting the server to the client device, via a mobile gateway, through an application interface (API) on the server, wherein the API comprises instructions for sending, receiving, and translating information between the server and the client device and wherein the client device is adapted for sending, upon user engagement, a request to the server to provide the monitored status of the at least one service;

receiving, from the client device, the status request;

sending, from the monitoring application to the API, the monitored data related to the at least one service;

translating, by the API, the monitored data related to the service to obtain the status of the service in the computing environment, wherein the translating comprises applying thresholding to the monitored data, utilizing current and historical monitored service status, to categorize the service status prior to sending the service status to the client device;

sending the status category for the at least one service from the server to the client device via the API;

receiving, from the client device, a request to repair a subset of services in the at least one service;

translating, by the API, the request to repair to obtain a type of request received from the client device;

adjusting the subset of services by executing instructions based on the type of request; and sending the status category for the at least one service from the server to the client device, the status category reflecting changes after adjusting the subset of services.

2. The method of claim 1, wherein the API is a web service that facilitates sending and receiving information in JavaScript Object Notation (JSON) format.

3. The method of claim 1, wherein the at least one service includes a database management service (DB2) or a message queuing service (MQ).

4. The method of claim 1, wherein the mobile gateway is configured to manage connectivity and communication between a mobile device and the server.

5. The method of claim 1, wherein the server is a mainframe computing environment comprising a plurality of customer information control system (CICS) servers.

6. The method of claim 1, wherein the status category comprises three levels, the first level indicating a service level problem, the second level indicating a service level warning, and the third level indicating normal operation.

7. The method of claim 1, wherein the monitoring application stores the monitored data in a database, the database providing access to current and historical status of the plurality of services.

8. The method of claim 1, wherein the request to repair is one or more selected from the group consisting of: modifying storage space, reconnecting database management services, reconnecting message queuing services, modifying threads, or throttling transactions.

9. A mobile device, comprising:
a display;
a network interface; and
a processor to execute computer executable instructions stored on a non-transient computer readable medium so that when the instructions are executed, by the processor, a method is carried out comprising:
upon user engagement, sending, with the network interface via a mobile gateway, to a server running a plurality of services, a request to provide a status of at least one service of the plurality of services,
receiving, from the server via an application interface (API) on the server, status category of the at least one service, wherein the status category comprises three levels, the first level indicating a service level problem, the second level indicating a service level warning, and the third level indicating normal operation, and wherein the API on the server comprises instructions for sending, receiving, and translating information between the server and the client device, converting the status category to graphical indicators, providing the graphical indicators to be displayed on the display,
sending, with the network interface to the server, a request to repair a subset of services in the at least one service, and
receiving, from the server via the API on the server, the status category of the at least one service, the status category reflecting changes after completion of a repair based on the request to repair.

10. The mobile device of claim 9, wherein the graphical indicators are shapes, symbols, and/or colors.

11. The mobile device of claim 9, wherein the display is configured to display both a name associated with the at least one service and a graphical indicator associated with the at least one service.

12. The mobile device of claim 11, wherein when status category of one or more services in the at least one service is the first level or the second level, the display provides a more-information indicator next to a name associated with the one or more services.

13. The mobile device of claim 12, wherein when the more-information indicator is selected, the processor is further configured to extract a description of a service level problem from the status category of the one or more services, and the display is further configured to display the description of the service level problem.

14. The mobile device of claim 9, wherein the subset of services have status category information as one of the first level or the second level.

15. The mobile device of claim 14, wherein the request to repair is one or more selected from the group consisting of: modifying storage space, reconnecting database management services, reconnecting message queuing services, modifying threads, and throttling transactions.

16. A server for providing a portable client device with a monitored status of at least one service of a plurality of services in a computing environment, the server comprising a processor to execute computer executable instructions stored on a non-transient computer readable medium, so that executing the instructions causes the server to perform:
automatically periodically monitoring and aggregating monitored data related to the at least one service through a monitoring application on the server, wherein monitoring comprises collecting and logging status information of the services;
connecting the server to the client device, via a mobile gateway, through an application interface (API) on the server, wherein the API comprises instructions for sending, receiving, and translating information between the server and the client device and wherein the client device is adapted for sending, upon user engagement, a request to the server to provide the monitored status of the at least one service;
receiving, from the client device, the status request;
sending, from the monitoring application to the API, the monitored data related to the at least one service;
translating, by the API, the monitored data related to the service to obtain the status of the service in the computing environment,
wherein the translating comprises applying thresholding to the monitored data, utilizing current and historical monitored service status, to categorize the service status prior to sending the service status to the client device;

sending the status category for the at least one service from the server to the client device via the API;

receiving, from the client device, a request to repair a subset of services in the at least one service;

translating, by the API, the request to repair to obtain a type of request received from the client device;

adjusting the subset of services by executing instructions based on the type of request; and sending the status category for the at least one service from the server to the client device, the status category reflecting changes after adjusting the subset of services.

17. The server of claim 16, wherein the at least one service includes a database management service (DB2) or a message queuing service (MQ).

18. The server of claim 16, wherein the request to repair is one or more selected from the group consisting of: modifying storage space, reconnecting database management services, reconnecting message queuing services, modifying threads, or throttling transactions.

* * * * *